United States Patent
Guha et al.

(10) Patent No.: US 11,987,011 B2
(45) Date of Patent: May 21, 2024

(54) HYBRID FIBER BASED MOLDING THERMOPLASTIC ARTICLE AND PROCESS OF FORMING SAME

(71) Applicant: Continental Structural Plastics, Inc., Auburn Hills, MI (US)

(72) Inventors: Probir Kumar Guha, Bloomfield Hills, MI (US); Philippe Bonte, Pouance (FR); Marc-Philippe Toitgans, Pouance (FR); Dominique Boyer, Pouance (FR)

(73) Assignee: Teijin Automotive Technologies, Inc., Auburn Hills, MI (US)

( * ) Notice: Subject to any disclaimer, the term of this patent is extended or adjusted under 35 U.S.C. 154(b) by 416 days.

(21) Appl. No.: 16/464,552

(22) PCT Filed: Nov. 28, 2017

(86) PCT No.: PCT/US2017/063379
§ 371 (c)(1),
(2) Date: May 28, 2019

(87) PCT Pub. No.: WO2018/102282
PCT Pub. Date: Jun. 7, 2018

(65) Prior Publication Data
US 2021/0107236 A1    Apr. 15, 2021

Related U.S. Application Data

(60) Provisional application No. 62/427,870, filed on Nov. 30, 2016.

(51) Int. Cl.
*B29C 70/02* (2006.01)
*B29B 15/10* (2006.01)
(Continued)

(52) U.S. Cl.
CPC .......... *B29C 70/025* (2013.01); *B29B 15/105* (2013.01); *B29C 70/12* (2013.01);
(Continued)

(58) Field of Classification Search
CPC ......... B29C 70/12; B29C 70/14; B29C 70/46; B29C 70/202; B29C 70/545;
(Continued)

(56) References Cited

U.S. PATENT DOCUMENTS

| 5,445,693 A | 8/1995 | Vane |
| 5,883,021 A | 3/1999 | Beer et al. |

(Continued)

FOREIGN PATENT DOCUMENTS

| JP | S600224530 A | 11/1985 |
| JP | 2007276476 A | 10/2007 |

(Continued)

OTHER PUBLICATIONS

Espacenet translation of JP2015030950A. (Year: 2015).*

(Continued)

*Primary Examiner* — Jeremy R Pierce
*Assistant Examiner* — Christine X Nisula
(74) *Attorney, Agent, or Firm* — MaxGoLaw PLLC

(57) ABSTRACT

A process is provided for thermal molding an article with at least one layer of thermoplastic fibers that are non-woven and uni-directionally oriented in combination with at least one layer of reinforcing fibers. The reinforcing fibers including glass, carbon, nature based, and combinations thereof; alone or mixed with chopped thermoplastic fibers. Upon subjecting the layers to sufficient heat to thermally bond in the presence of non-oriented filler fibers, thermoplastic fiber fusion encapsulates the filler fibers. The filler fibers impart physical properties to the resulting article and the residual unidirectional orientation of the thermoplastic melt imparts (Continued)

physical properties in the fiber direction to the article. By combining layers with varying orientations of uni-directional fibers relative to one another, the physical properties of the resulting article may be controlled and extended relative to conventional thermoplastic moldings. The uni-directional fibers may have discontinuities along the length of individual fibers.

10 Claims, 4 Drawing Sheets

(51) Int. Cl.
| | |
|---|---|
| B29C 70/12 | (2006.01) |
| B29C 70/20 | (2006.01) |
| B29C 70/46 | (2006.01) |
| B32B 5/02 | (2006.01) |
| B32B 5/08 | (2006.01) |
| B32B 5/10 | (2006.01) |
| B32B 5/12 | (2006.01) |
| B32B 5/26 | (2006.01) |
| B29K 101/12 | (2006.01) |
| B29K 105/10 | (2006.01) |
| B29K 105/16 | (2006.01) |

(52) U.S. Cl.
CPC .......... *B29C 70/202* (2013.01); *B29C 70/465* (2013.01); *B32B 5/02* (2013.01); *B32B 5/022* (2013.01); *B32B 5/08* (2013.01); *B32B 5/10* (2013.01); *B32B 5/12* (2013.01); *B32B 5/26* (2013.01); *B29K 2101/12* (2013.01); *B29K 2105/105* (2013.01); *B29K 2105/165* (2013.01); *B32B 2262/02* (2013.01); *B32B 2262/101* (2013.01); *B32B 2262/106* (2013.01); *B32B 2264/10* (2013.01); *B32B 2398/20* (2013.01)

(58) Field of Classification Search
CPC ..... B29C 2793/0081; B32B 3/10; B32B 3/26; B32B 5/12; B32B 5/26; B32B 2250/20; B32B 2307/516; B32B 2307/518; B29K 2105/105; B29B 15/08; Y10T 428/249942
USPC .................................................. 442/366–368
See application file for complete search history.

(56) References Cited

U.S. PATENT DOCUMENTS

| | | | |
|---|---|---|---|
| 5,883,023 A | 3/1999 | Martine et al. | |
| 6,025,285 A | 2/2000 | Vyakarnam et al. | |
| 7,759,267 B2 | 7/2010 | Conover et al. | |
| 2008/0318000 A1* | 12/2008 | Horigome | B32B 5/02 428/116 |
| 2009/0117399 A1 | 5/2009 | Frecka | |
| 2009/0155522 A1* | 6/2009 | Raghavendran | B32B 7/12 428/113 |
| 2010/0092770 A1* | 4/2010 | Wadahara | C08J 5/24 428/339 |
| 2012/0164907 A1* | 6/2012 | Restuccia | B32B 5/145 442/381 |
| 2013/0337219 A1* | 12/2013 | Shields | B32B 5/26 428/116 |
| 2015/0030804 A1* | 1/2015 | Baser | B32B 5/08 428/109 |
| 2015/0258712 A1* | 9/2015 | Moser | D04H 3/115 428/113 |
| 2018/0126674 A1 | 5/2018 | Ohtani et al. | |

FOREIGN PATENT DOCUMENTS

| | | |
|---|---|---|
| JP | 2015030950 A * | 2/2015 |
| JP | 2016196624 A | 11/2016 |
| WO | 0192002 A2 | 12/2001 |
| WO | 2015031893 A1 | 3/2015 |

OTHER PUBLICATIONS

Int'l. Search Report for PCT/USZ017I063379, dated Feb. 21, 2018.
Supplementary Partial ESR for EP17875629, dated Jun. 15, 2020.
Reasons for Rejection issued in corresponding Japanese Patent Appln. No. 2019-517218, dated Sep. 28, 2021.

* cited by examiner

HYBRID FIBER BASED MOLDING THERMOPLASTIC ARTICLE AND PROCESS OF FORMING SAME

CROSS-REFERENCE TO RELATED APPLICATION

This application claims priority of U.S. Provisional Patent Application Ser. No. 62/427,870 filed Nov. 30, 2016, which is incorporated herein by reference.

FIELD OF THE INVENTION

The present invention in general relates to a molded article and a process for making the same, and in particular, to an article produced by molding with a unidirectional oriented thermoplastic fiber layer combined with reinforcing non-oriented fibers.

BACKGROUND OF THE INVENTION

Many vehicle components are currently formed by the thermoset cure of resins containing reinforcing fibers. The additive packages and processing of sheet molding compositions (SMCs) are both complex in simultaneously achieving weight reduction, high surface sheen, and physical properties demanded for vehicle manufacturing.

While thermoplastics offer many processing advantages, generally thermoplastics have met with limited acceptance owing insufficient physical properties in the resulting articles. In part, use of thermoplastics have been hampered by the finite grades of thermoplastic woven fibers available. While custom weaves that include fibers that vary in properties are readily produced, the custom process that is necessary increases lead time for production and has limited value in tuning properties as the variations available in fiber thickness and fiber count per unit area. While non-woven thermoplastic fiber mats, rovings, and even chopped, non-oriented thermoplastic fibers afford benefits in terms of material cost, any benefit is overshadowed by the reduced strength and does little to tune the insert property of density.

Thus, there exists a need for processes that overcome the physical limitations associated with thermal forming of articles based on woven thermoplastic fibers filled with other additives. There further exists a need to eliminate the volatile monomers associated with SMC resins.

SUMMARY OF THE INVENTION

A stack is provided that includes at least one layer of non-oriented fibers having glass fibers, carbon fibers, or a combination thereof, and at least two layers of uni-directional and non-woven thermoplastic fibers composed of a first type of thermoplastic fiber having a length and a diameter.

A process is provided for forming an article that includes mixing non-oriented filler fibers to form a non-oriented layer, contacting the non-oriented layer with at least two layers of uni-directional non-woven thermoplastic fibers to form a stack, and heating the stack to fuse the thermoplastic fibers to one another to form a fused matrix in which the non-oriented filler fibers are embedded, and cooling the fused matrix to form the article.

BRIEF DESCRIPTION OF THE DRAWINGS

The present invention is further detailed with respect to the following drawings that are intended to show certain aspects of the present invention, but should not be construed as a limit on the practice of the present invention.

DESCRIPTION OF THE INVENTION

Figure 1:
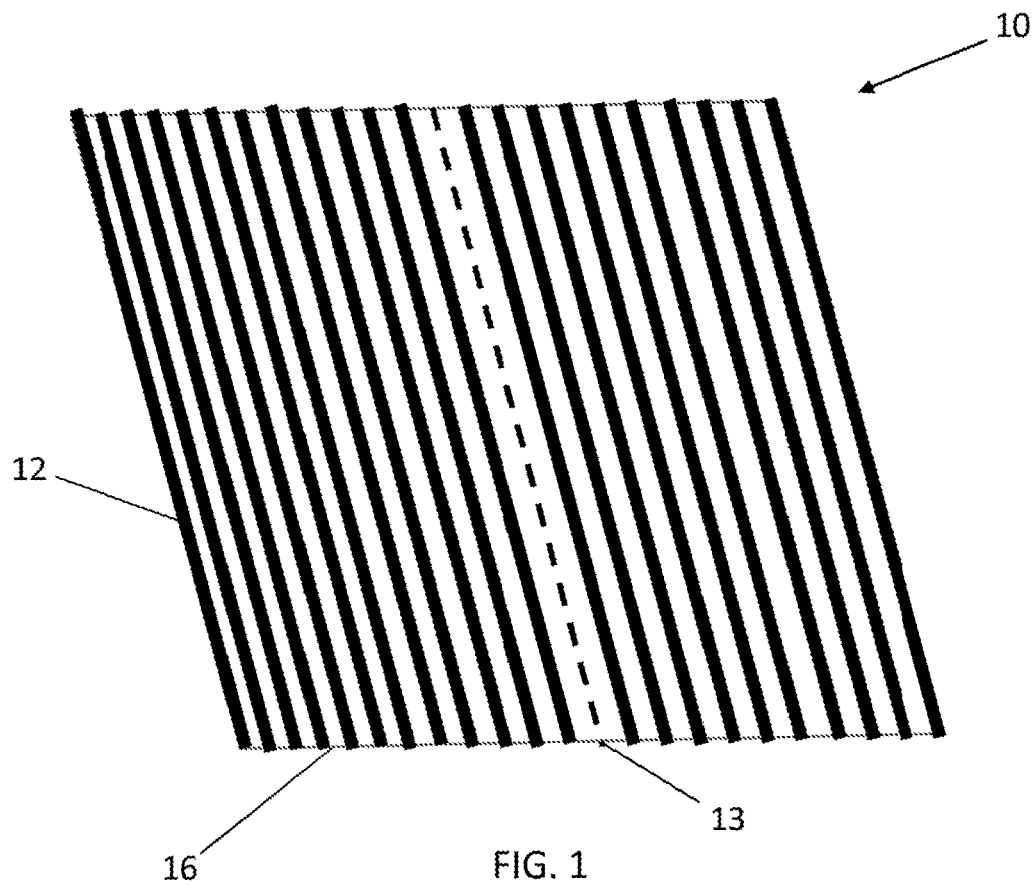
FIG. 1 shows a sheet formed with unidirectional oriented non-woven parallel strands of glass, carbon fibers, and thermoplastic fibers.

The present invention has utility as a process for thermal molding an article with at least one layer of thermoplastic fibers that are non-woven and uni-directionally oriented in combination at least one layer of reinforcing fibers. The reinforcing fibers including glass, carbon, nature based, and combinations thereof; alone or mixed with chopped thermoplastic fibers. Upon subjecting the layers to sufficient heat to thermally bond in the presence of non-oriented filler fibers, thermoplastic fiber fusion encapsulates the filler fibers. The filler fibers impart physical properties to the resulting article and the residual unidirectional orientation of the thermoplastic melt imparts physical properties in the fiber direction to the article. By combining layers with varying orientations of uni-directional fibers relative to one another, the physical properties of the resulting article may be controlled and extended relative to conventional thermoplastic moldings. In some inventive embodiments, uni-directional fibers have discontinuities along the length of individual fibers.

Inventive articles are used in a variety of applications illustratively including vehicle components such as automotive body panels, bumpers, pick-up boxes, interior light bases, posts, undercar components, cross members, chassis components, and frame components; architectural components such as home doors, sound damping panels, and weather resistant wood replacement. The present invention has the attributes of low scrap generation, process flexibility with respect to part shape and fiber material. Embodiments of the present invention improve recyclability and reduce costs with the inclusion of natural fiber fillers. Additionally, owing to the thermoplastic nature of inventive articles, mar damage or post-molding imperfections may be corrected in some instances with the application of heat in a process akin to ironing.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

A layer of uni-directional oriented non-woven parallel strands thermoplastic fibers operative herein illustratively include polyethylene, polypropylene, polyamides, polyimides, polyether ether ketone (PEEK), polycarbonates, polyethylene terephthalate (PET), copolymers of any of the aforementioned, and mixtures of any of the aforementioned individual polymers or copolymers as mixed fiber layers. It is appreciated that a layer of thermoplastic fibers in some embodiments includes replacement individual fibers, or bundles of fibers in place of an individual thermoplastic fiber; the replacement fiber being glass, carbon, natural, a combination thereof, or a combination thereof with a thermoplastic fiber. By way of example, a given uni-directional nylon fiber is replaced with one of the following: a similar diameter glass fiber, a bundle of smaller diameter carbon fibers, a bundle of glass and carbon fibers, at least one carbon fiber bundled with the same thermoplastic fiber or a different type of thermoplastic fiber relative to the homogenous thermoplastic layer; where fiber diameters are relative to that of the homogenous thermoplastic fiber being replaced.

A unidirectional thermoplastic fiber layer is inserted into a mold in a variety of forms including cutting and applying the fibers from a set of parallel rolls of fibers, or as a preformed layer. A preformed layer is preferred in complex article formation owing to the ease of retaining fiber orientation. A preformed layer is provided in a variety of ways including periodic spacing of retainer lines intersecting the parallel fibers. Retainer lines are formed in a variety of ways that illustratively include a thermoplastic hot glue applied across the unidirectional fibers, or periodic weave of fibers as is common in the Sudare weaving technique used on a larger scale to fashion blinds and mats from bamboo. Such vastly spaced retainer lines produced by Sudare weaving are intended to be encompassed within the definition of non-woven as owing to the spacing between such retainer lines relative to fiber length. Retainer lines are typically separated by a distance of from 30 to 1,000 times the diameter of the uni-directional fibers being retained. It is appreciated that a layer of uni-directional fibers is planar, or zig-zag—with a pattern of planes defined by fibers 1-2-1-2 . . . , or 1-2-3-1-2-3 . . . to define biplanar and triplanar layers, respectively. In some inventive embodiments, a central mirror plane exists between the layers. By way of example, fiber orientations include 1-2-2-1, 1-2-3-2-1, 1-2-3-4-3-2-1, and 1-2-3-4-5-5-4-3-2-1. Without intending to be bound to a particular theory, a central mirror plane of layers limits warping during processing a surface is placed in tension that is not greater than the tension on the opposing surface thereto.

Uni-directional fibers layers make up at between 40 and 98 total weight percent of the fiber content. Typical lengths of the individual unidirectional thermoplastic fibers are between 0.5 and 3,000 cm. Typical diameters of the thermoplastic fibers are between 0.01 and 0.7 mm.

In some inventive embodiments, multiple layers of uni-directional fibers are overlaid prior to fusion. These layers may be overlaid with a variety of angular displacements relative to a first layer. If zero degrees is defined as the long axis of an article, successive layers are overlaid at angles of 0-90. With specific patterns illustratively include 0-45-90-45-0, 0-45-60-60-45-0, 0-0-45-60-45-0-0, 0-15-30-45-60-45-30-15-0, and 0-90-45-45-60-60-45-45-90-0. While these exemplary patterns are for from 5 to 10 layers of uni-directional fibers, it is appreciated that layers range from 2 to 20. It is further appreciated that randomized fill fibers are readily interspersed between any two of such layers of uni-directional fibers, layered beneath the at least one layer of uni-directional fibers, above the at least one layer of uni-directional fibers, or a combination thereof.

Filler fibers operative in an inventive process include glass; carbon; and natural cellulosic fibers such as hemp, cane, bamboo, jute, straw, silk, straw, palm frond, coconut husk, coconut fiber; and combinations thereof. Typical lengths of filler fibers used in the present invention typically range from 0.5 to 5 centimeters (cm). It is appreciated that continuous, direction use of such filler fibers are also operative in the current invention. The diameters of filler fibers are appreciated to vary widely based on commercial sources with glass filler fibers having typical diameters of 0.03 to 0.5 millimeters (mm); carbon filler fibers having typical diameters of 0.005 to 0.1 mm; and natural filler fibers having typical diameters of 0.01 to 0.3 mm. It should be appreciated that fiber dimensions outside of the aforementioned typical ranges exist and are intended to be within the scope of the present invention.

The filler fibers are either applied to a mold surface or onto layer of uni-directional fibers as a dry or as a slurry. Advantage of the present invention relative to SMC molding is the lack of styrene monomer and the associated VOC release during molding. A slurry, if present is formed that includes a source of fibers of a given diameter that have been cut to a predetermined length or a variety of lengths; the fibers being in a solvent along with additives. The additives including a dispersing agent, particulate fillers to promote drying, binders, or a combination thereof. The slurry applied using a conventional preform system or used with an inventive centrifugal preform system.

A solvent for the slurry is largely dictated only by handling properties and compatibility with mold form materials, fibers, and slurry additives. Solvents operative herein illustratively include water, $C_1$-$C_{12}$ alcohols, toluene, ($C_1$-$C_6$ alkyl)-$C_1$-$C_6$ esters, ($C_1$-$C_6$)$_2$C=O ketones, and miscible combinations thereof. In order to comply with limits on volatile organic content (VOC) and waste treatment, in certain inventive embodiments, the slurry is aqueous. As will be detailed hereafter, a self-contained slurry is also provided with solvent recycle thereby obviating concerns about solvent VOC content and handling.

Randomized dry cut fiber filler is readily formed with a cutter dropping fiber lengths into a vortex before dropping onto a conveyor as detailed in PCT/US2017/014853.

The present invention affords particular advantages in terms of recycled content, strength, density, or a combination of such properties through the inclusion of fiber fillers. In certain inventive embodiments carbon filler fiber represents 0 to 80 total fiber weight percent of the non-oriented fiber weight. In certain inventive embodiments glass filler fiber represents 0 to 80 total fiber non-oriented fiber weight. In certain inventive embodiments both glass and carbon fiber fillers are present with the remainder of the fiber being thermoplastic fibers, cellulosic fiber or a combination thereof.

Referring now to the figures, FIG. 1 shows a layer 10 formed with uni-directional oriented non-woven parallel fibers 12 of thermoplastic fibers. In a specific embodiment, a combination of glass and nylon fibers or carbon/nylon fibers compose the layer of uni-directional oriented non-woven parallel fibers. For visual clarity, a single substitute fiber 13 is also depicted that is a similar diameter glass fiber, a bundle of smaller diameter carbon fibers, a bundle of glass and carbon fibers, at least one carbon fiber bundled with the same thermoplastic fiber or a different type of thermoplastic fiber relative to the majority thermoplastic layer. It is appreciated that neither the fiber diameter nor the number of fibers is to scale to better illustrate the present invention.

Figure 2:
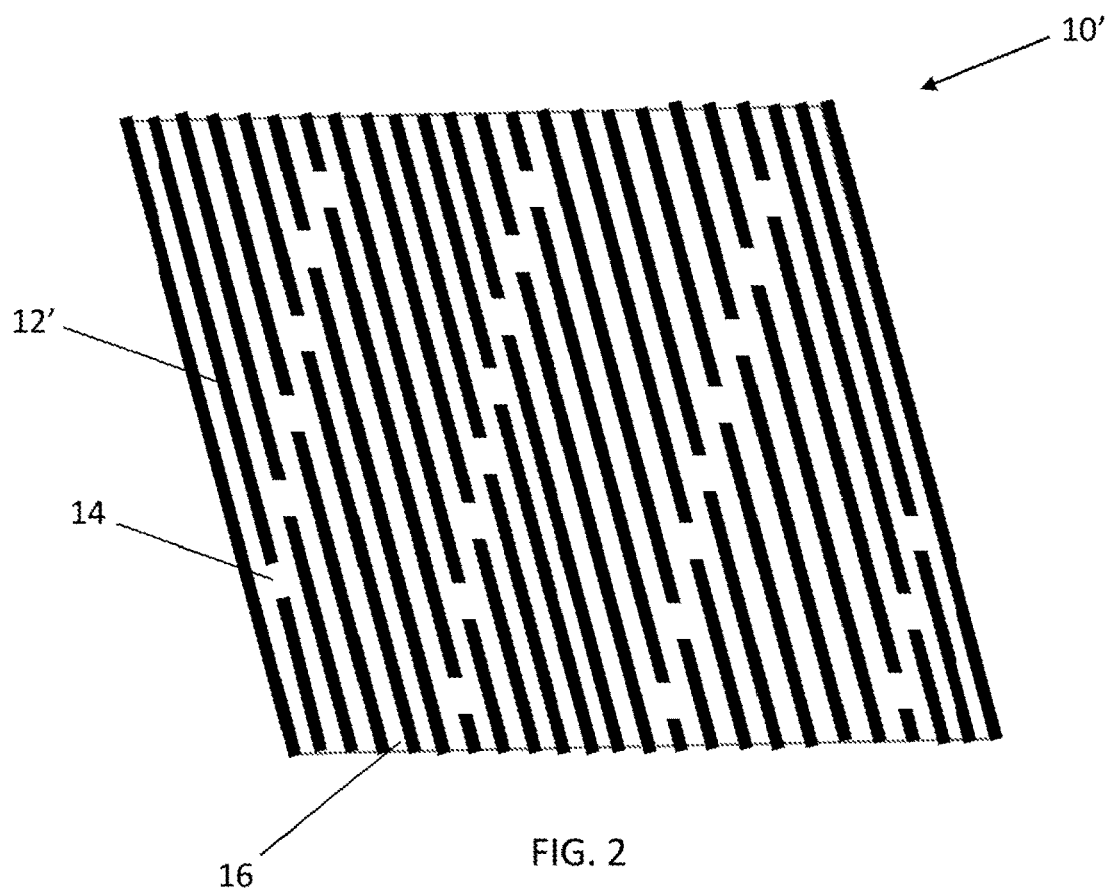
FIG. 2 illustrates a thermoplastic sheet with intentional breaks or gaps in the unidirectional oriented non-woven parallel strands.

FIG. 2 illustrates a layer 10' with an intentional discontinuity 14 in the uni-directional oriented non-woven parallel fibers 12'. Without intending to be bound to a particular theory, the discontinuity 14 serves as stress relief points in the sheet 10'; additionally, the length of the discontinuities 14 creates a void volume that either lower the overall density of the resulting article, volume for filing additive insertion, compression relief during molding, or a combination thereof. The length of a given discontinuity ranges from 0.001 mm to 5% of the length of a uni-directional fiber that lacks a discontinuity therein. In some inventive embodiments, the discontinuities are staggered. In still other inventive embodiments, the discontinuities are all of the same length. In still other inventive embodiments, the discontinuities are staggered periodically. While depicted as a single layer 10', it is appreciated that multiple such layers are typically used and typically rotationally displaced relative to one another.

Figure 3:
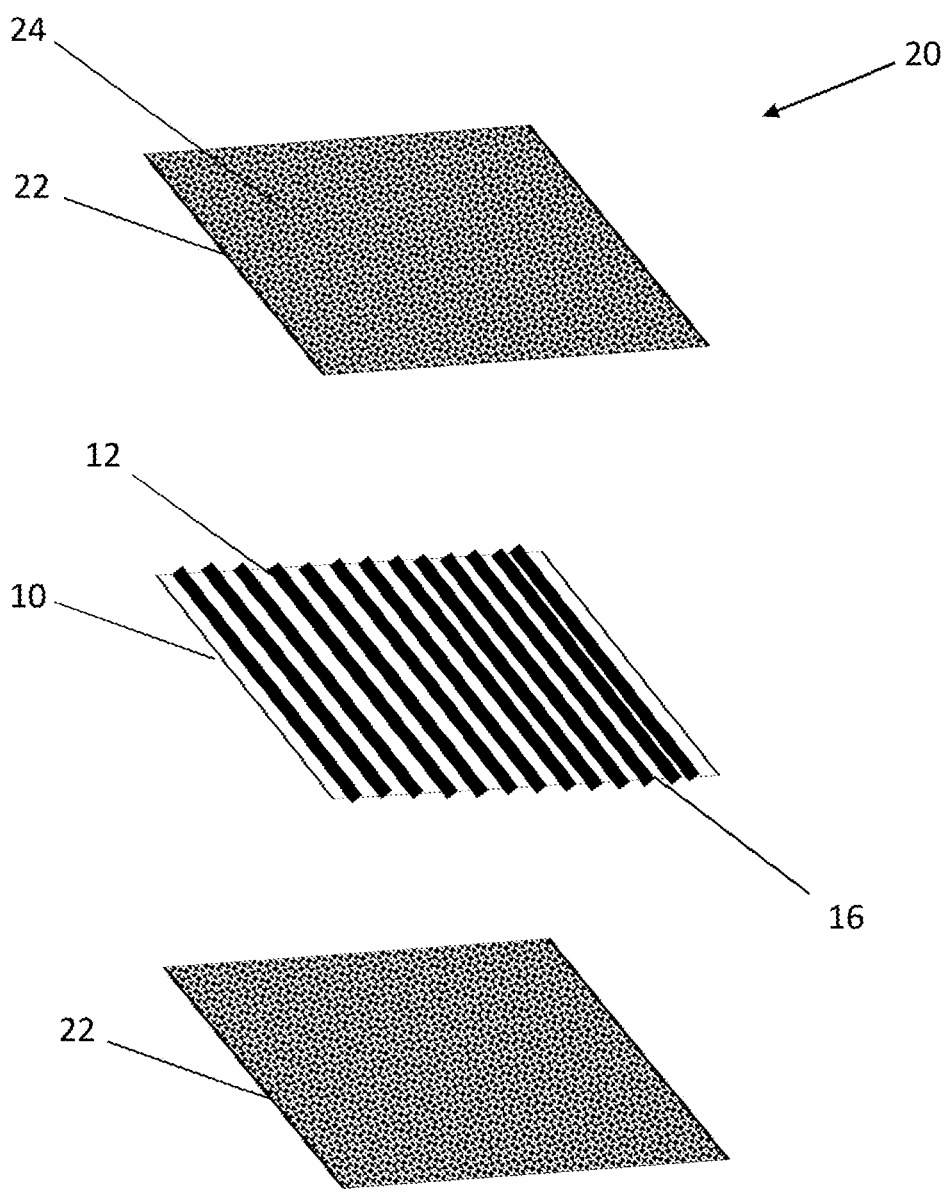
FIG. 3 shows an exploded view of a stack formed of layers.

FIG. 3 shows an exploded view of a stack 20 formed of layers, including a layer 10 or 10'. The outer layers 22 have cut fibers that include glass alone, carbon alone, or a combination thereof alone or intermixed with at least one of cellulosic fibers, thermoplastic fibers as described above that are non-oriented, while the inner layer may be the sheet 10 as described with respect to FIG. 1 or a sheet 10' as described with respect to FIG. 2. It is appreciated that the carbon fiber can be virgin, recycled, or a combination thereof.

By heating the stack under conditions controlled by properties that include thermoplastic fiber glass transition temperature, the thickness of the stack, thermal conductivity of the non-oriented fiber layers, thickness of the non-oriented fiber layers, dwell time at the elevated temperature and pressure at elevated temperature, the thermoplastic fibers present melt or at least soften to hold the whole mass together and function as a matrix. Upon cooling, the formed stack functions as a separate complete article, or as an insert used in sheet molding compound (SMC) and resin transfer molding (RTM). It is appreciated that when the stack is placed on a contoured mold platen, that the cooled and formed article will retain the shape of the contoured mold platen.

Figure 4:
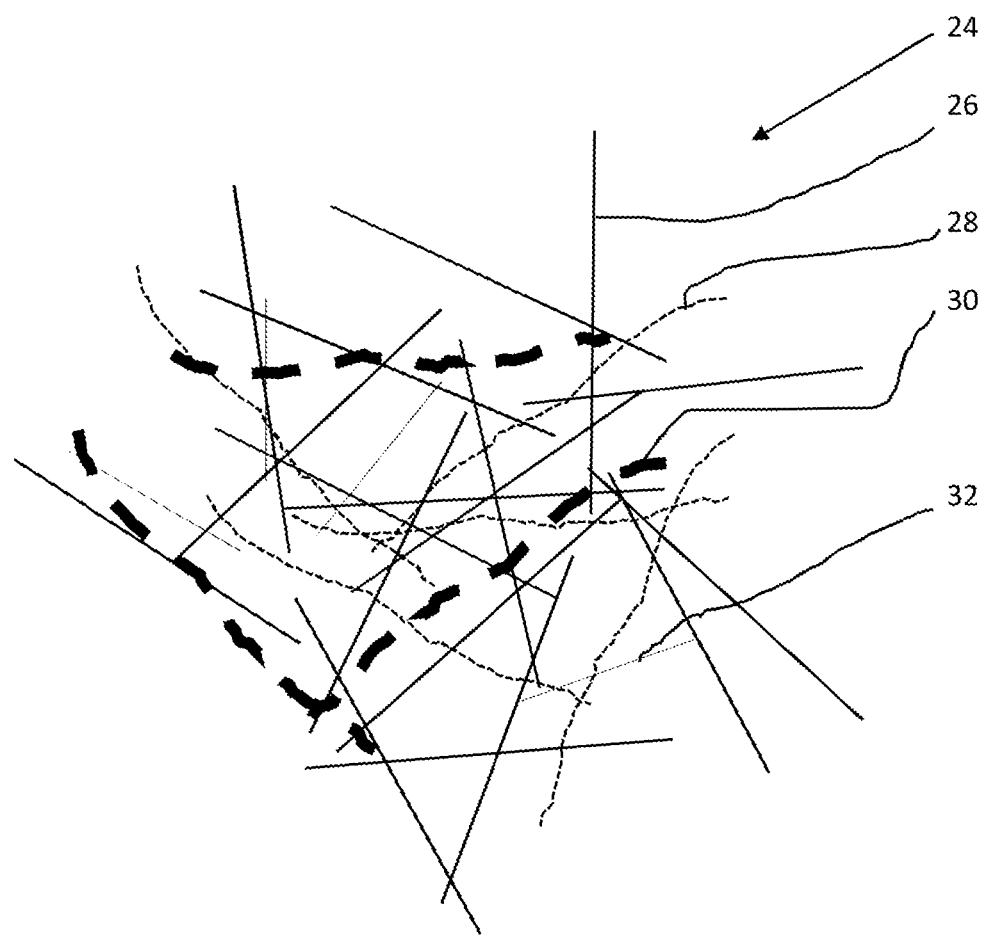
FIG. 4 is a schematic depicting a region of thermoplastic non-oriented fibers intermixed with filler fibers according the present invention.

FIG. 4 shows a schematic of a fiber matrix that is used in some embodiments in the outer layers 22 of FIG. 3 generally at 24 or as an intermediate layer between layers 10, 10', or a combination thereof. Cut glass fibers 28, carbon fibers 32, and cellulosic filler fibers 30 being present in the fiber matrix 24.

In some inventive embodiments, a filler is provided that promotes rapid drying of the preform by thermal exposure. High thermal conductivity fillers operative herein illustratively include carbon fibers with values of 8-70 W/m-K (pan) and 20-1000 W/m-K (pitch), MN 260 W/m-K, BN 300 W/m-K, graphite 600 W/m-K, or carbon black, alumina, or combinations thereof. Incorporating fillers with paramagnetic properties in the fiber matrix allows the preform to be heated rapidly by induction heating for rapid cure cycles and for improved fiber wet-out. The paramagnetic properties keeps a preform from overheating above the Curie Temperature of the paramagnetic particle. Paramagnetic fillers of gadolinium and $CrO_2$ with Curie temperature of 292 and 386 Kelvin, respectively are used, each alone or in combination to promote self-limiting induction heating. High thermal conductivity fillers or paramagnetic fillers are present from 0.0001 to 5 total weight percent of the stack.

Additional additives include plasticizers, thermoplastic alloys, antistatic agents, microspheres, and combinations thereof. Such additional additives, if present, are typically individually present in a from 0.00001 to 4 total weight percent of the stack. It is appreciated that such additives can be added as powders between stack layers or formulated into thermoplastic fibers added as chopped or substitute fibers in a uni-directional layer.

A lower density article is also provided when the material includes hollow glass microsphere having an outer diameter of between 10 and 120 microns. Microspheres are, if present, typically individually present from 0.5 to 8 total weight percent of the stack.

Figure 5:
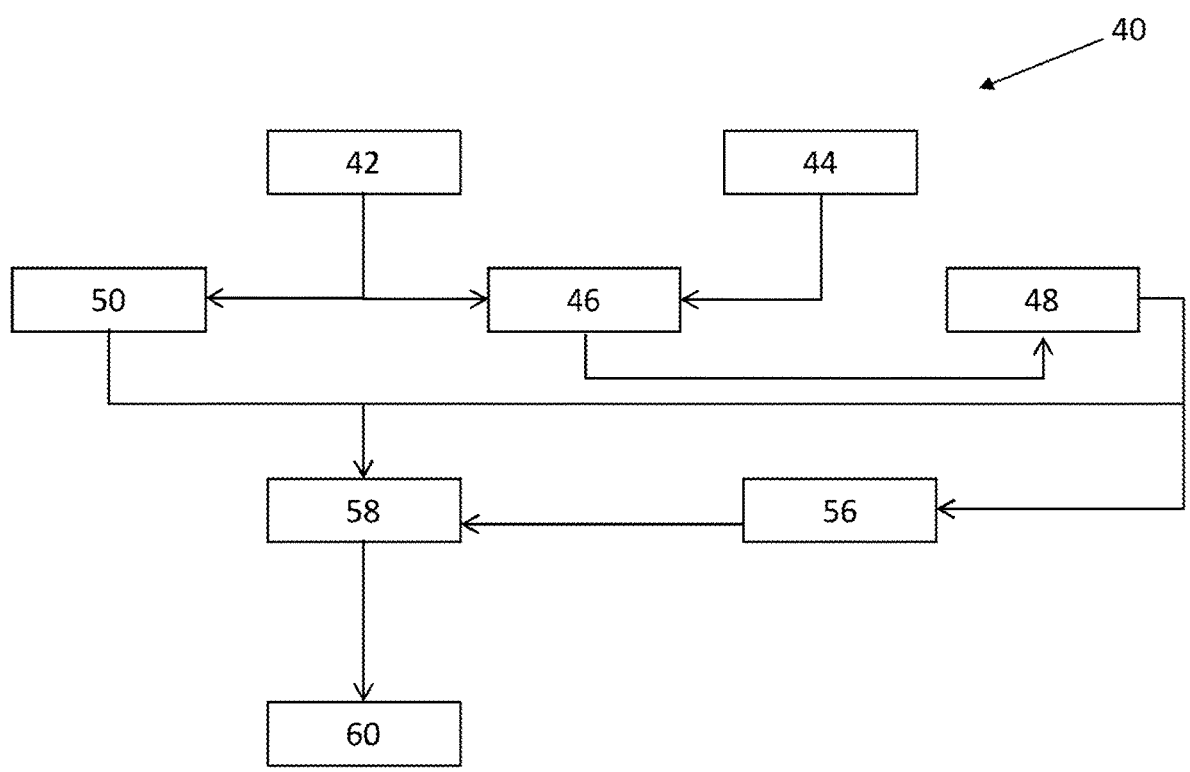
FIG. 5 is a schematic of the process for forming an article according to an embodiment of the invention.

FIG. 5 shows a schematic of a process for forming an article of FIG. 3 according to the present invention generally at 40 and using the same as a portion of an overmolded article. A supply of chopped filler fibers 42 and thermoplastic fibers 44 are combined to form a fiber mixture 46. It is appreciated that the supply of filler fibers can itself include separate sources of fibers from among glass, carbon, and cellulosic fibers with multiple types of a particular type of filler fibers that vary in length, diameter, composition, or a combination of such properties being present in other inventive embodiments. It should further be appreciated that additional additives as noted above are present in this mixture. The fiber mixture 46 is then slurried or transferred as a dry mass either directly to contact with a mold surface or a layer of uni-directional thermoplastic fibers such that upon heating fusion is achieved between thermoplastic fibers to afford an article or an insert. It is appreciated that multiple layers of fiber mixture 46 are interspersed between layers 10 or 10' as detailed above, or as an overlayer on a stack of layers. The stack is formed at step 48 and heated at step 56. The heating 56 is accompanied by compression molding typically occurring between two or more contoured mold platens that form a cavity representative of the desired article. In the event that additives are provided as powders or formed into thermoplastic fibers at step 50, these additives are then used in and introduced into the stack prior to compression molding at 56 to produce an article. In some inventive embodiments, information feedback is provided with computer aided engineering article design to optimize design and article properties. The article is finished through processes that illustratively include trimming, sanding, priming, painting, joining to other components, or a combination thereof at step 60.

The foregoing description is illustrative of particular embodiments of the invention, but is not meant to be a limitation upon the practice thereof. The following claims, including all equivalents thereof, are intended to define the scope of the invention.

The invention claimed is:

1. A stack comprising:
   at least one layer of non-oriented fibers comprising glass fibers having diameters of 0.03 to 0.5 millimeters (mm), carbon fibers having diameters of 0.005 to 0.1 mm, and natural filler fibers having diameters of 0.01 to 0.3 mm, or a combination thereof; and
   at least two layers of uni-directional and non-woven individual thermoplastic fibers composed of a first thermoplastic fiber having a length and a diameter, the first thermoplastic fiber being any of polyethylene, polypropylene, nylon polyamides, polyimides, polyether ether ketone (PEEK), polycarbonates, polyethylene terephthalate (PET), or a copolymer or mixture thereof, wherein said at least two layers of uni-directional non-woven thermoplastic fibers include a discontinuity in the length, each of the at least two layers having a zero angle defined by a long axis of an article;
   wherein said at least two layers of uni-directional and non-woven individual thermoplastic fibers make up between 40 and 98 total weight percent of the stack fiber content; and
   wherein said at least two layers of uni-directional non-woven thermoplastic fibers are angularly displaced from one another relative to the long axis to define a central mirror plane therebetween or a multiplanar pattern when said at least two layers are four layers.

2. The stack of claim 1 wherein said at least two layers of uni-directional non-woven thermoplastic fibers includes substitute fibers of at least one of a glass fiber, a carbon fiber, or a second thermoplastic fiber.

3. The stack of claim 1 wherein the discontinuity has a linear extent of from 0.001 mm to 5% of the length.

4. The stack of claim 1 wherein a plurality of the thermoplastic fibers each have one or more discontinuities in the length.

5. The stack of claim 1 wherein the length of the first thermoplastic fiber is between 0.5 and 3,000 cm.

6. The stack of claim 1 wherein the diameter of the first thermoplastic fiber is between 0.01 and 0.7 mm.

7. The stack of claim 1 further comprising at least one retainer line along the length.

8. The stack of claim 1 wherein said at least one layer of non-oriented fibers is interspersed between said at least two layers of uni-directional non-woven thermoplastic fibers.

9. The stack of claim 1 further comprising at least filler of microspheres, aluminum nitride, alumina, boron nitride, carbon black or graphite.

10. A stack comprising:
at least one layer of non-oriented fibers comprising glass fibers having diameters of 0.03 to 0.5 millimeters (mm), carbon fibers having diameters of 0.005 to 0.1 mm, and natural filler fibers having diameters of 0.01 to 0.3 mm, or a combination thereof; and at least two layers of uni-directional and non-woven individual thermoplastic fibers each of the at least two layers having a zero angle defined by a long axis of the article, said at least two layers composed of a first thermoplastic fiber having a length and a diameter, the first thermoplastic fiber being any of polyethylene, polypropylene, nylon polyamides, polyimides, polyether ether ketone (PEEK), polycarbonates, polyethylene terephthalate (PET), or a copolymer or mixture thereof, wherein each of the at least two layers of uni-directional and non-woven thermoplastic fibers include at least one retainer line that intersects the individual thermoplastic fibers;

wherein said at least two layers of uni-directional and non-woven individual thermoplastic fibers make up between 40 and 98 total weight percent of the stack fiber content; and wherein said at least two layers of uni-directional non-woven thermoplastic fibers are angularly displaced from one another relative to the long axis to define a central mirror plane therebetween or a multiplanar pattern when said at least two layers are four layers.

\* \* \* \* \*